United States Patent Office 3,308,215
Patented Mar. 7, 1967

3,308,215
HEAT TREATING OF POLYPROPYLENE FILM TO REMOVE SAGS AND WRINKLES
Anthony Graham Marshall Last, Welwyn Garden City, England, assignor to Imperial Chemical Industries Limited, London, England, a corporation of Great Britain
No Drawing. Filed Dec. 18, 1962, Ser. No. 245,423
Claims priority, application Great Britain, Dec. 22, 1961, 46,037/61; Mar. 9, 1962, 9,125/62
7 Claims. (Cl. 264—95)

This invention relates to processes for the manufacture of shrinkable polypropylene film and to the films so made.

The object of this invention is to provide a method for the manufacture of a substantially sag-free or wrinkle-free biaxially oriented shrinkable polypropylene film for use in for instance, shrink packaging applications.

The invention consists in a process of reducing sag and wrinkles in a polypropylene film which has been biaxially oriented by a tubular process in which such film in a collapsed or slit condition is held at its edges to restrain transverse shrinkage and is subjected to a heat treatment under conditions of time and temperature such that the film readjusts itself (with little or no overall shrinkage) sufficiently to substantially reduce sag and wrinkles but not sufficiently severe to cause substantial heat setting of the film or result in shrinkage whereby its desired shrinkage properties are lost at the temperature at which shrink packaging is desired.

By "sag" is meant "variations in the length-wise dimensions of the film" for which geometrical factors and thermal non-uniformity in the stretching and collapsing of the tube during the biaxial stretching process are responsible. Film containing sag will not lie upon a flat surface without wrinkling.

In a conventional shrink packaging machine a wrapped and sealed package is exposed to circulating hot air in a shrink tunnel wherein the temperature is controlled at some point in the circulating system. Nevertheless due to imperfect control and poor mixing the package normally encounters a range of temperatures. It is usual to quote the ambient temperature, in other words the temperature of the air circulating in the shrink tunnel. The actual film temperature during shrink packaging will also depend on other variables such as residence time in the shrink tunnel and the shape of the article being wrapped.

In general, as the temperature at which the heat treatment of the present invention is carried out is increased, so the higher should be the temperature of the subsequent shrink packaging operation. The upper limit for the latter is dictated by the development of a white discoloration in the film and/or by melting of the film. It is normally desirable to keep the temperature in the shrink tunnel as low as possible and for that reason it is preferred to carry out our heat treatment at relatively low temperatures, for instance down to 60° C.

In general, the heat treatment may be carried out at temperatures up to 100° C. where the film is to be used for shrink packaging applications at, for instance, ambient temperatures of not less than 180° C. Naturally, if shrink packaging is to be carried out at higher ambient temperatures, the temperature of the heat treatment may be higher, for instance, up to 120° C. and in general should not be above about 80° C. less than the expected lowest shrink packaging temperature. For the highest shrinkages it is preferred that the film is stretched somewhat or is not allowed to undergo an overall shrinkage during the heat treatment. By referring to an overall shrinkage we recognize that those parts of the film whose excessive length is responsible for the sag in the film before our heat treatment must, in fact, shrink during the heat treatment in order to obtain the benefit of our invention but such shrinkage is localized and confined to the areas of sag; in itself it does not amount to any overall shrinkage. Stretching of the film during our heat treatment step can only be to a small extent otherwise it splits. In general overall shrinkage during the heat treatment is by not more than 2% in the longitudinal direction and by not more than 5%, preferably by not more than 2.0%, in the transverse direction; also the temperature of this treatment preferably is no higher than 35° C. below the envisaged ambient packaging temperature.

The process is preferably conducted using a tenter and more preferably a substantially parallel or slightly diverging tenter which will give a transverse draw of not more than 5% although heat treatment using for instance rollers having means to engage the edges of the film and permit some shrinkage over the roller is possible. For ease of operation the collapsed film is preferably slit before subjecting it to our heat treatment step.

The process is preferably carried out using high shrinkage film prepared according to our copending application Serial No. 187,132, filed April 12, 1962. Such film is prepared by a tubular process in which a tube of un-oriented polypropylene has its temperature adjusted, preferably by heating, to a temperature below the melting point at which it can be uniformly expanded to biaxially orient it and is expanded by internal gaseous pressure (with or without an additional stretch in the longitudinal direction) and is hauled off as a biaxially oriented polypropylene film, characterized in that the film is cooled by circumferentially, uniformly applied draughts of air at least over the second half of its zone of expansion and under conditions of temperature of the tube before stretching it and internal gaseous pressure such that the hoop stress in the polypropylene tube just before it commences to stretch is at least 16.5 p.s.i. and preferably, in order to get the higher shrinkages, it is at least 20 p.s.i.

By the use of such film according to our copending application, polypropylene film is provided by the present invention which is transparent, shrinkable, substantially sag-free (i.e. the sag is no more than 0.3%) and biaxially oriented, having an "area" shrinkage (measured on specimens heated for one minute at 120° G.) of at least 20% combined with a tensile break strength of at least 25,000 p.s.i. in all directions in its plane and/or a haze of less than 10%.

In general such films may be obtained having a transverse direction shrinkage above 18% with a thickness in the range 0.0004 to 0.0016 inch.

The "area" shrinkage is defined as the sum of the longitudinal and transverse shrinkages and approximates to the true area shrinkage from which it differs by only a small amount which can be neglected.

Haze is measured as the "percentage of light scattered from a tungsten filament lamp light beam outside a 6 minute of arc angle." A haze of 15% is obviously visible; a haze of 5% is just visible.

*Example 1*

Polypropylene film (made from polypropylene prepared in the presence of hydrogen, having a melt flow index between 30 and 45 measured at 190° C. using a 10 kg. load) which had been:

(a) Stretched by a tubular process with a stretch ratio of 6.5 in both directions with a hoop stress in the polypropylene tube before stretching of at least 16.5 p.s.i. and a hoop stress in the film as it finishes stretching above 4,500 p.s.i. in accordance with our copending application Serial No. 187,132, and, (b) Thereafter collapsed, slit and opened up to give a double width film (c) Was fed into a parallel tenter at an oven temperature stated below in order substantially to remove the sag and wrinkles in the film (by substantially reducing sag in this specification is meant reducing the sag to a value of less than or equal to 0.3%). The shrinkage and sag properties of the film obtained are set out in Table I. The thickness of the film before and after the tenter treatment was .0006 inch.

TABLE I

| Oven temperature, °C. | Film Speed, ft./min. | Percent Sag after treatment | | Percent Shrinkage at 120° C. | | Percent Shrinkage at 140° C. | |
|---|---|---|---|---|---|---|---|
| | | | | Before | After | Before | After |
| 87 | 60 | 0.25 | T.D. | 12.0 | 10.8 | 27.5 | 27.6 |
| | | | M.D. | 6.4 | 4.8 | 14.2 | 14.0 |
| 83–84 | 50 | 0.15–0.3 | T.D. | 12.0 | 11.1 | 27.5 | 25.6 |
| | | | M.D. | 6.4 | 4.2 | 14.2 | 10.7 |
| 83 | 150 | 0.2 | T.D.gg | 12.0 | 10.8 | 30.8 | 27.5 |
| | | | M.D. | 6.4 | 4.7 | 17.0 | 14.2 |
| 83 | 150 | 0.2 | T.D. | 12.0 | ---- | 29.2 | 27.5 |
| | | | M.D. | 6.4 | ---- | 15.7 | 14.2 |
| 83 | 150 | 0.2 | T.D. | 12.0 | 10.8 | 27.5 | 25.8 |
| | | | M.D. | 6.4 | 3.7 | 14.5 | 13.0 |
| 83 | 300 | 0.25 | T.D. | 12.0 | 10.6 | 28.0 | 27.5 |
| | | | M.D. | 6.4 | 5.3 | 15.6 | 14.5 |
| 60 | 100 | 0.25 | T.D. | 11.6 | ---- | 26.2 | 25.6 |
| | | | M.D. | 5.6 | ---- | 12.5 | 13.7 |

T.D.=Transverse direction. M.D.=Machine direction.
Sag before treatment was 0.35–0.7% depending on position of measurement across the film.

*Example II*

A polypropylene film which had been prepared in accordance with the description given in Example I and subjected to a similar tenter treatment at varying temperatures gave shrinkages at 120° C. as set out in Table II. The thickness of the film was 0.00075 inch.

TABLE II

| Oven Temperature, °C. | Percent Shrinkage at 120° C. for 1 min. | | Total Shrinkage at 120° C. (M.D.+T.D.) shrinkage |
|---|---|---|---|
| | M.D. | T.D. | |
| 70 | 8.1 | 10.4 | 18.5 |
| 75 | 7.0 | 10.4 | 17.4 |
| 80 | 7.2 | 10.0 | 17.2 |
| 85 | 7.5 | 9.4 | 16.9 |
| 90 | 7.9 | 8.4 | 16.3 |
| 95 | 7.6 | 7.8 | 15.4 |
| 100 | 7.0 | 7.5 | 14.5 |

*Example III*

Polypropylene film as in Example I which had been:
(a) Stretched by a tubular process, with a stretch ratio of 7.2:1 in the machine direction and 6.5:1 in the transverse direction with a hoop stress in the polypropylene tube before stretching of 22.0 p.s.i. and after stretching above 4,500 p.s.i. in accordance with our copending application Serial No. 187,132, and
(b) Thereafter collapsed, slit and opened up to give a double width film
(c) Was fed into a parallel tenter at an oven temperature of 95° C. at 200 ft./min. No shrinkage was allowed in the tenter. The thickness of the film before and after tenter treatment was 0.00045 inch. The sag in the film before tentering was 0.8% and its "area" shrinkage at 120° C. was 26% while the tensile strength in the machine direction was 27,000 p.s.i. and in the transverse direction 25,500 p.s.i.

After the tenter treatment the sag was, over the whole of the film, below 0.25%; the haze was below 6% over the whole of the film, the "area" shrinkage at 120° C. was 21% and the tensile strength was unchanged at 27,000 p.s.i. in the machine direction and 25,500 p.s.i. in the transverse direction.

I claim:
1. A process for preparing a shrinkable polypropylene film having reduced sag and wrinkles therein for use in shrink packaging or the like, said process comprising the steps of providing a polypropylene film which has been biaxially oriented by a tubular process, holding the film at its edges to restrain transverse shrinkage and substantially reducing sags and wrinkles in the film by subjecting the film to a heat treatment of not more than 100° C. wherein the time and temperature conditions of the treatment are respectively so short and so low as to be insufficient to effect heat setting and substantial loss of shrink-ability of the film at packaging temperatures higher than that of the heat treatment, wherein the shrinkage during said heating treatment is by not more than 5.0% in the transverse direction, and by not more than 2.0% in the longitudinal direction.

2. A process according to claim 1 in which said film is processed in the collapsed condition.

3. A process according to claim 2 in which the film is processed in double width by first collapsing, slitting and opening the film.

4. A process according to claim 1 in which the heat treatment is carried out while the film is continuously moved forward in a slightly diverging tenter.

5. A process according to claim 1 in which the temperature of heat treatment is not more than 80° C. below the temperature at which shrink packaging is desired.

6. A process according to claim 1 in which the heat treatment is carried out while the film is continuously moved forward in a substantially parallel tenter.

7. A process according to claim 1 in which the film subjected to the heat treatment has been prepared by a tubular process for stretching polypropylene in which a tube of unoriented polypropylene has its temperature adjusted to a temperature below the melting point at which it can be uniformly expanded to biaxially orient it and is expanded by internal gaseous pressure and is hauled off as a biaxially oriented polypropylene film, and in which the film has been cooled by circumferentially, uniformly applied draughts of air at least over the second half of its zone of expansion and under conditions of temperature of the tube before stretching it and internal gaseous pressure such that the hoop stress in the polypropylene tube just before it commences to stretch is at least 16.5 p.s.i.

References Cited by the Examiner
UNITED STATES PATENTS

| | | | |
|---|---|---|---|
| 2,517,570 | 8/1950 | Irons | 264—342 |
| 2,517,581 | 8/1950 | Lowry et al. | 264—342 |
| 2,603,838 | 7/1952 | Lowry et al. | 264—342 |

ROBERT F. WHITE, *Primary Examiner.*

EARL M. BERGERT, *Examiner.*

L. T. PIRKEY, A. R. NOE, *Assistant Examiners.*